United States Patent
Negm (10) Patent No.: US 11,729,142 B1
(45) Date of Patent: Aug. 15, 2023

(54) SYSTEM AND METHOD FOR ON-DEMAND EDGE PLATFORM COMPUTING

(71) Applicant: Google LLC, Mountain View, CA (US)

(72) Inventor: Mohamed Negm, Bonn (DE)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/895,658

(22) Filed: Aug. 25, 2022

(51) Int. Cl.
*H04L 61/5076* (2022.01)
*H04L 61/4511* (2022.01)
*H04L 61/2575* (2022.01)
*H04L 61/2589* (2022.01)

(52) U.S. Cl.
CPC ...... *H04L 61/5076* (2022.05); *H04L 61/4511* (2022.05); *H04L 61/2575* (2013.01); *H04L 61/2589* (2013.01)

(58) Field of Classification Search
CPC ............ H04L 61/5076; H04L 61/4511; H04L 61/2575; H04L 61/2589; H04L 61/30
USPC ................ 709/206, 220, 223, 224, 225, 227
See application file for complete search history.

(56) References Cited

U.S. PATENT DOCUMENTS

| | | | | |
|---|---|---|---|---|
| 11,461,211 B1* | 10/2022 | Harwood | .............. | G06F 16/256 |
| 2009/0191873 A1* | 7/2009 | Siegel | ................ | H04L 65/1073 455/435.2 |
| 2020/0169616 A1* | 5/2020 | Chen | ........................ | H04L 67/55 |
| 2020/0169880 A1* | 5/2020 | Wen | ....................... | H04L 63/102 |
| 2020/0358738 A1* | 11/2020 | Mircescu | .............. | H04W 12/69 |
| 2021/0099905 A1* | 4/2021 | Huang | .............. | H04W 28/0268 |
| 2021/0400537 A1* | 12/2021 | Zhang | ...................... | H04L 47/28 |
| 2021/0409335 A1* | 12/2021 | Zhu | .......................... | H04L 47/24 |
| 2022/0116334 A1* | 4/2022 | Zhu | ........................ | H04L 47/622 |
| 2022/0124043 A1* | 4/2022 | Zhu | ..................... | H04L 47/2483 |

FOREIGN PATENT DOCUMENTS

CA    2888665 A1 *  5/2014  ......... G06Q 30/0269

* cited by examiner

*Primary Examiner* — Khanh Q Dinh
(74) *Attorney, Agent, or Firm* — Lerner David LLP (57) ABSTRACT

Systems and methods for managing deployment of applications and services within a network having a plurality of edge platforms. A domain name service (DNS) request from a client device requesting for content from a third-party provider is modified to include location information indicating a client device location. A deployment manager uses the location information in the modified request to select a nearby edge platform for servicing the request. Changes to the edge platform servicing the request may be imitated based on changes in location information received in future requests. The deployment manager may also maintain a database to track resources that are already deployed in nearby edge platforms, conserving resources when selecting the edge platforms to service requests. The deployment manager also directs third-party content providers to the edge platform using a separate service so that communication with third-party content providers does not share the location information.

19 Claims, 7 Drawing Sheets

| Application List | Edge Platforms Servicing |
|---|---|
| Application A | Edge Platform 1, Edge Platform 2 |
| Service K | Edge Platform 6 |
| Application P | Edge Platform 2 |
| SERVICE Q | Edge Platform 2, Edge Platform 5 |

SYSTEM AND METHOD FOR ON-DEMAND EDGE PLATFORM COMPUTING

BACKGROUND

Recent developments in network-based and distributed computing technologies have given rise to an increased role for edge platforms. Edge platforms may be deployed through a network, leading to additional computing resources being distributed throughout the periphery of the network. This means that user data can be processed much closer to client devices such as user devices, and without relying on centralized computing resources such as a centralized datacenter. Edge platforms can achieve improvements in user security by keeping data closer to the user device, processing efficiency by processing the data closer to the user device, and reducing networking bandwidth by avoiding the need for long-distance data communication in favor of relatively local computing resources.

However, the shift to computing at edge platforms also creates new challenges. For example, in the case of mobile user devices such as smartphones, laptops and vehicles, the edge platform that is best positioned to service the device may regularly change. Typically, changing one edge platform to another requires ending a session at the first platform and then starting a new session at the next platform. This can be a very slow process, leading to user experiences due to slow connectivity and high latency. Alternatively, the amount of available resources at the edge platform can be increased to avoid strain. However, such an approach undermines the very purpose of edge platforms, which is to avoid concentrating computing resources in a single location.

For further example, some edge platforms are operated by telecommunication network operators that are separate from the providers of the content for the user device. This creates a challenge in communicating between the telecommunication network operator and the content provider, since it may be necessary for the telecommunication network operator to maintain privacy of user data such as user device location data and avoid sharing such data with the content providers.

Additionally, the use of edge platforms allows for computing services to be spread out across multiple entities along a service chain. For example, separate resources may be utilized by each of content providers, content delivery network providers, telecommunication network operators, and so on. Therefore, if each user device request for service of content is separately handled, it may lead to inefficient use of network resources to support the user device requests, which in turn may result in inefficient use and may impact costs, performance, and network bandwidth.

BRIEF SUMMARY

The present disclosure provides a system and method for providing a fully distributed cloud computing infrastructure that is able to cover as much as possible the demands from user devices at the periphery of the network. The proposed system enables a network operator to connect users to a nearest edge platform with respect to user device location, and optimize the use of edge resources across the operator's platforms, while also ensuring the user information is kept private and secure.

In one aspect of the present disclosure, a method for managing content deployment in a network includes: receiving, at network gateway device, a domain name service (DNS) request from a client device, the DNS request for content from a third-party provider; modifying, at the network gateway device, the DNS request to include location information indicative of a location of the client device; receiving, by a DNS resolver, the modified DNS request from the network gateway device; determining, by the DNS resolver, an address of the requested content based on a domain name included in the DNS request; receiving, by a deployment manager, the address of the requested content and the location information from the DNS resolver; accessing, by the deployment manager, a service status database indicating at which one or more edge platforms of the network the content is deployed; selecting, by the deployment manager, a first edge platform based on the location information and the service status database; and notifying, by the deployment manager, the client device of the first edge platform handling the requested content.

In some examples, the method may further include, in response to the service status database indicating that the content is not yet deployed at any of the edge platforms of the network: instructing, by the deployment manager, the first edge platform to prepare infrastructure for handling the content; instructing, by the deployment manager, the third-party provider to deploy the content to the first edge platform; and updating the service status database to indicate that the content is deployed at the first edge platform.

In some examples, the content may be an application, and the prepared infrastructure may include a service instance for running the deployed content.

In some examples, selecting the first edge platform may be based at least partially on a distance between the first edge platform and the client device location being shorter than a distance between another edge platform and the client device location.

In some examples, instructing the third-party provider to deploy the content to the first edge platform may be performed using a token-based application program interface (API) and without providing the client device location to the third-party provider.

In some examples, selecting the first edge platform may be at least partially in response to the service status database indicating that the content has already been deployed at the first edge platform of the network.

Another aspect of the disclosure is directed to a method for managing content deployment in a network, the method including: receiving, by a deployment manager, a first request from a client device, the first request containing an address of content from a third-party provider requested by the client device, the first request further containing first location information indicating a first location of the client device; selecting, by the deployment manager, a first edge platform for servicing the first request based on the first location information; notifying, by the deployment manager, the client device of the first edge platform servicing the first request; receiving, by the deployment manager, a second request from the client device, the second request containing the address of the content from the third-party provider, the second request further containing second location information indicating a second location of the client device different from the first location; determining, by the deployment manager, whether to service the second request using the first edge platform or using a second edge platform based on the second location information; and notifying, by the deployment manager, the client device of the determined first or second edge platform for servicing the second request.

In some examples, the method may further include, in response to determining to service the second request using the first edge platform, transmitting, by the deployment manager an IP address of the first edge platform to the client device without the deployment manager communicating with the first edge device and without the deployment manager communicating with the third-party provider.

In some examples, the method may further include, in response to determining to service the second request using the second edge platform: instructing, by the deployment manager, the second edge platform to prepare infrastructure for handling the content; instructing, by the deployment manager, the third-party provider to deploy the content to the second edge platform; and transmitting, by the deployment manager, an IP address of the second edge platform to the client device.

In some examples, the method may further include: receiving, by the deployment manager, confirmation of deployment of the content at the second edge platform; and in response to receiving the confirmation, instructing, by the deployment manager, the first edge platform to terminate deployment of the content at the first edge platform.

In some examples, the first request may be received by the deployment manager via a first network gateway device configured to add the first location information to the first request, and the second request may be received by the deployment manager via a second network gateway device configured to add the second location information to the second request.

In some examples, the method may further include accessing, by the deployment manager, a service status database indicating at which one or more edge platforms of the network the requested content is deployed. Selecting the first edge platform may be based further on information stored in the service status database.

In some examples, the method may further include, in response to determining to service the second request using the second edge platform: instructing, by the deployment manager, the second edge platform to prepare infrastructure for handling the content; instructing, by the deployment manager, the third-party provider to deploy the content to the second edge platform; and transmitting, by the deployment manager an IP address of the second edge platform to the client device; receiving, by the deployment manager, confirmation of deployment of the content at the second edge platform; in response to receiving the confirmation, instructing, by the deployment manager, the first edge platform to terminate deployment of the content at the first edge platform; and updating the service status database to indicate that the content is deployed at the second edge platform and not deployed at the first edge platform.

A further aspect of the disclosure is directed to a system for managing content deployment in a network, the system including: memory storing a database indicating a plurality of applications and services and at which ones of a plurality of edge platforms of the network the plurality of applications and services are deployed; and one or more processors configured to: receive, from a first client device, a first request for servicing an application or service on an edge platform of the network, the first request including first location information indicative of a location of the first client device; access the database in response to receiving the first request; select a first edge platform based on the first location information and the database; and notify the first client device of the first edge platform servicing the requested application or service.

In some examples, the system may further include the plurality of edge platforms, each edge platform including one or more servers positioned geographically within a predetermined location or region of the network.

In some examples, the system may further include a plurality of network gateway devices in communication with the one or more processors and configured to relay the first request from the first client device to a domain name service (DNS) resolver, the DNS resolver configured to extract an IP address from the relayed request and transmit the IP address to the one or more processors, the first request being received by one or more processors contains the extracted IP address.

In some examples, the plurality of network gateway devices may be further configured to modify the first request to include the first location information, and the DNS resolver may be configured to transmit the IP address and the first location information of the first request to the one or more processors.

In some examples, the plurality of edge platforms may be operated by a telecommunications service provider, the requested application or service may be hosted by a content provider separate from the telecommunications provider, and communications between the plurality of edge platforms and infrastructure of the content provider may exclude the first location information.

In some examples, the one or more processors may be further configured to: receive, from a second client device, a second request for servicing the application or service on an edge platform of the network, the second request including second location information indicative of a location of the second client device; access the database in response to receiving the second request, the database indicating that the requested application or service is already being serviced at the first edge platform; in response to the second location information meeting one or more proximity criteria for the first edge platform, select the first edge platform and notify the second client device of the first edge platform servicing the requested application or service; and in response to the second location information not meeting the one or more proximity criteria for the first edge platform, select a second edge platform and notify the second client device of the second edge platform servicing the requested application or service.

In some examples, the one or more processors may be further configured to: receive, from the first client device, a second request for servicing the application or service on an edge platform of the network, the second request including second location information indicative of an updated location of the first client device; in response to the second location information meeting one or more proximity criteria for the first edge platform, notify the second client device of the first edge platform continuing to service the requested application or service; and in response to the second location information not meeting the one or more proximity criteria for the first edge platform: select a second edge platform, the second location information meeting the one or more proximity criteria for the second edge platform; notify the second client device of a change to the second edge platform servicing the requested application or service; and instruct the first edge platform to terminate servicing the requested application or service.

DETAILED DESCRIPTION

Overview

An aspect of the disclosed technology includes methods and systems that identify edge platforms that allow for efficient use or reuse of edge platform infrastructure in providing a networked service to a client device. For instance, the methods and systems provide techniques to identify edge platform resources that allow for low latency connections of computing devices to applications or services provided via a network. In another aspect of the disclosed technology, methods and systems are provided that allow connectivity of client devices communicating with a networked application or instance while such devices roam and switch between edge platforms. The disclosed technologies make efficient use of edge platform resources, and allow for efficient data aggregation and processing in providing networked services.

The techniques of the disclosed technology include edge platform discovery. This aspect of the disclosed technology involves a process that enables discovery by a client device of a given edge platform to support a service request from a networked computing or client device. Discovery involves determining the location of the client device and based on the location determining edge platform resources at or near the client device location that may be used to support the service request. A determination of suitable edge platform resources may comprise determining edge platform resources closest to the client device or whether other computing devices within range of the location of the user are already being provided the same service. As another example, the determination may comprise determining whether it may be cost-effective to support the service request using edge platform resources based on costs. For instance, in some cases, it may be more cost-effective to use an already existing service chain outside the predetermined location rather than establish a new service chain.

A system supporting the disclosed technology may also allow for modifying a domain name service (DNS) request to include location client device location parameters or information. The location parameters or information may be used to determine edge platform resources for use in supporting the service request from the client device.

In an implementation, a network gateway may be configured to intercept the DNS request and insert the location parameters before passing the request on to a deployment manager of the network operator. The deployment manager may include a service orchestration module to facilitate communication between edge platforms and determine an appropriate edge platform for establishing the service chain based on the DNS request and location information included therein. The deployment manager may include additional functionality, such as a service status database for recording whether an application or service is already deployed so that requests can be directed to the same resources and additional resources are not wasted in multiple deployments of the same application or service. The deployment manager may also include a lighthouse service to guide content providers toward the edge platform based on the client device requests. The lighthouse service can facilitate drawing the content provider to the edge platform handling the client device request without sharing the user's private information.

As an example use case, the disclosed technology may be deployed in edge platform resources to use in creating an instance to support a new user request to play an online game. For instance, a first user's DNS request to access an online game may be modified to include location information associated with the user's computing device. The modification may be performed at a network gateway device. The network operator may then receive the request and use the location information to determine which edge platform resources should be used to establish the service chain with the user. This typically will involve communicating with edge platform providers associated with the location, accessing the service status database and communicating with the gaming content provider. If in accessing the service database, the network operator determines that the service has already been deployed at an edge platform within proximity to the first user, such as in the same town or on the same campus, the network operator may then instruct that edge platform associated to utilize the preexisting service chain and its already deployed infrastructure resources to provide service the first user's request.

Conversely, if there are no other players within proximity, the network operator may determine a suitable edge platform based on the location information in the modified DNS request. This may involve communication between multiple edge platform providers to determine which platform is best suited to provide service to the location indicated by the modified DNS request. Such a determination may also assess which network infrastructure resources, such as bandwidth, latency, and cost, are available to support the service chain. Once the appropriate edge platform is determined, it may initiate deployment of the infrastructure needed to support the service instance in response to the first user's request.

The techniques of the disclosed technology also facilitate seamless handover as the client device moves between network gateway devices, edge platforms, or both. A change in network gateway devices may indicate that the client device has moved between source and destination locations, which in turn may result in handover between a source location edge platform and a destination location edge platform. In such a handover, the service instance at the destination platform may be deployed before executing the handover and the service instance at the source platform may be deleted after the handover, so that no break in service is experienced by the user. Alternatively, the resources of the original source location edge platform may be best suited to service the client device regardless of the network gateway device relaying the DNS request. In such a case, the originally deployed instance may continue to be used to service the client device requests.

The systems and methods described herein enable edge platforms to communicate with one another to automatically find and select edge platforms in close proximity to client devices, allowing for good user experiences and low latency while maintaining low bandwidth requirements. In some cases, it may even be possible for a user request to bypass the initial application or service deployment procedure if the application or service is already deployed nearby, which may even further improve user experience and even further reduce latency. Furthermore, the systems and methods may facilitate seamless handover between edge platforms, when necessary, to maintain strong service for even mobile devices. All these advantages may be accomplished while also conserving resources at the network operator's end so that edge resources may be fully distributed.

Example Systems

Figure 1:
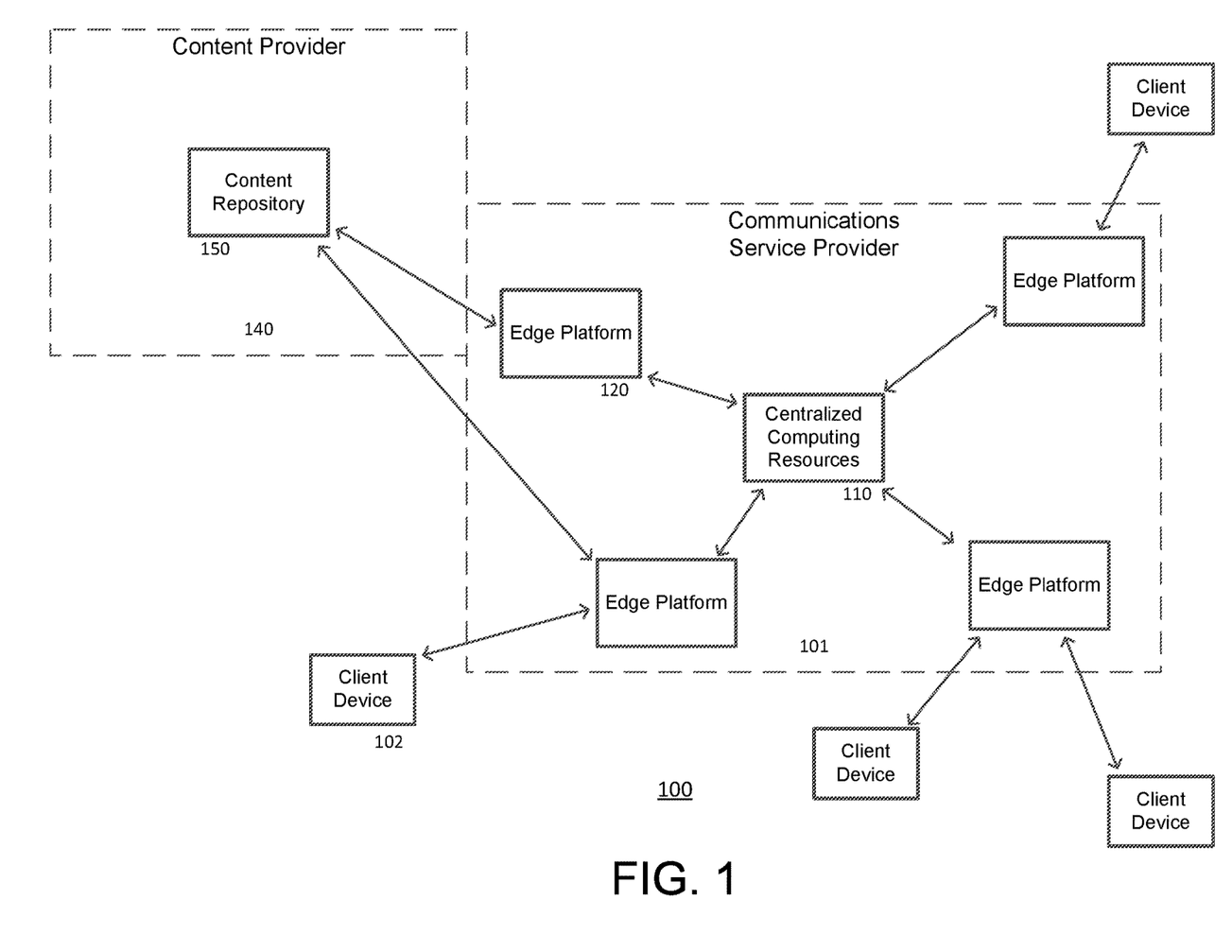
FIG. 1 is a block diagram of an example system in accordance with an aspect of the present disclosure.

FIG. 1 is a diagram of an example system 100 including a distributed network 101 for servicing user requests from a plurality of client devices 102. The distributed network 101 may include both centralized computing resources 110, such as a data center or cloud-based data processing systems, and edge computing resources, such as a plurality of edge platforms 120. The edge platforms 120 may be distributed across locations of a geographic region to provide relatively local computing resources to users of the region, compared to the centralized computing resources 110.

The distributed network 101 may provide for communication between the client devices 102 and edge platforms 120 either directly or indirectly through a plurality of network gateway devices 130. In some cases, a client device such as a tablet or smartphone may also serve as a network gateway device. The distributed network 101 may also provide for communication between the edge platforms and a content repository of a content provider 140 in order to retrieve content or services requested by the client devices 102. The content provider may be a third-party provider that is separate from a service provider operating the centralized computing resources, the edge platforms, or both. "Content" as used herein may refer to applications, services or other content that a user requests from a content repository 150 or other storage medium of the third-party provider.

In some cases, processing of the requested content or service may be primarily handled by the edge platform 120 in order to deliver low latency service to the client device 102 with minimal bandwidth requirements. Alternatively, the edge platform 120 may communicate with the centralized computing resources 110 in order to access a greater amount of computing resources when needed. In either case, the presence of the edge platform alleviates at least some of the processing and bandwidth required for fulfilling the client device request.

Figure 2:
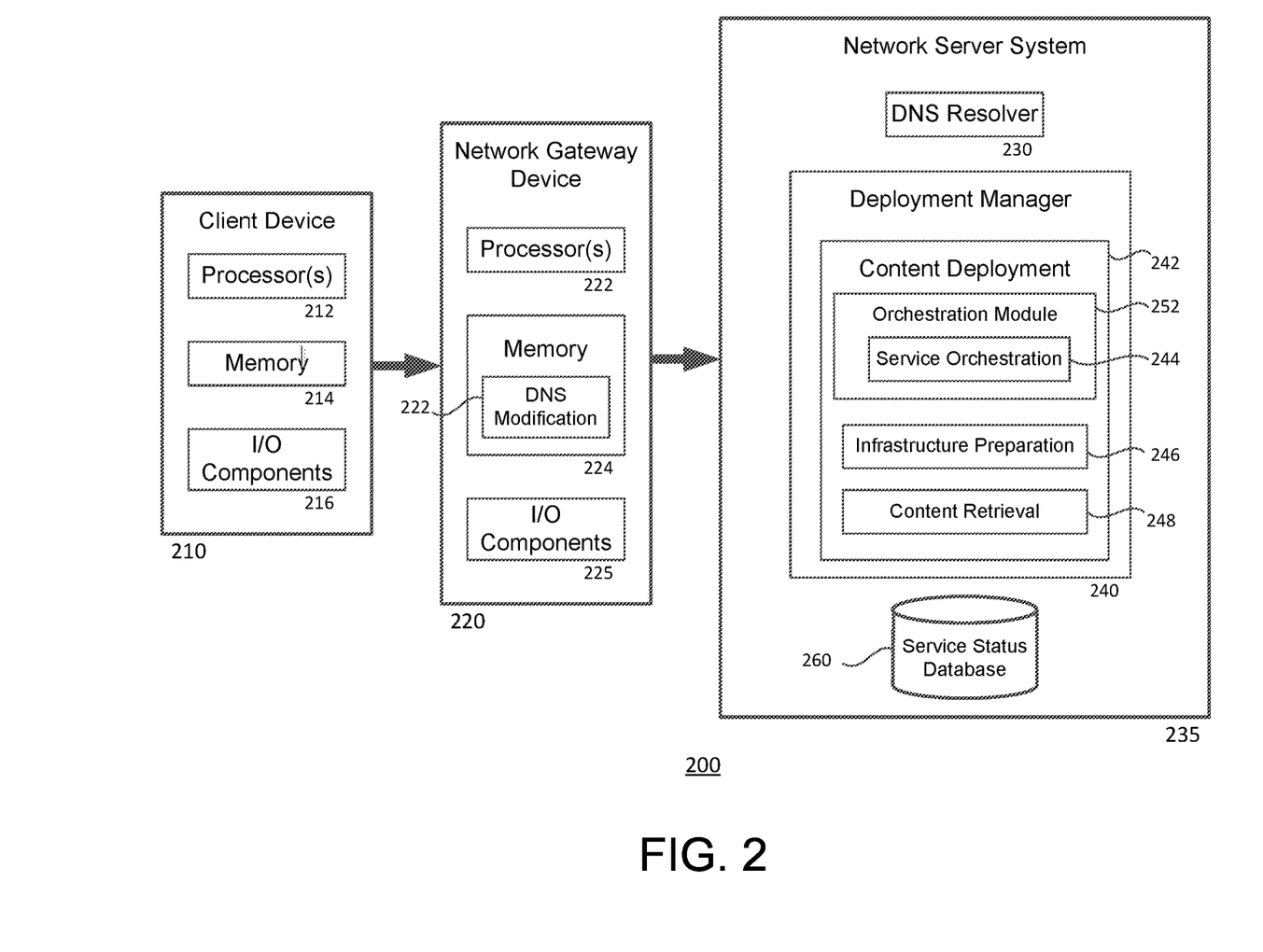
FIG. 2 is a block diagram of some components within the example system of FIG. 1.

FIG. 2 is a functional block diagram 200 illustrating at least some of the functions performed by the various components of the system 100 of FIG. 1.

As shown in FIG. 2, the client device 210 may include one or more processing units CPU(s) (also referred to herein as processors) 212, memory 214 and one or more network interfaces or other input/output (I/O) communication components 216 for communicating with other devices and components, as well as communication busses for connecting these components.

The memory 214 may include high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 214 optionally includes one or more storage devices remotely located from the processors 212. The memory 214, or non-volatile memory device(s) within the memory 214, may comprise a non-transitory computer-readable storage medium which may store programs, modules and data structures, or a subset thereof. Example programs or other data structures may include but are not limited to an operating system that includes procedures for handling various basic system services and for performing hardware dependent tasks, a network communication module for connecting the client device to other devices or components through one or more communication networks such as the Internet, other wide area networks, local area networks, metropolitan area networks, and so on, and a web browser for loading web pages and executing client applications.

The processor 212 may be configured to access data stored in the memory 214 and to execute instructions according to one or more programs stored in the memory 214 or in an external device accessed through the I/O components 216. For example the processor 212 of the client device 210 may be capable of executing an application or service provided by a third-party content provider. Executing the application or service may begin with or involve execution of a DNS request routine 225. The DNS request routine may involve identifying the hostname of the requested application or service.

A network gateway device 220 may include the same or similar components as the client device 210, such as a processor 222, memory 224 and I/O components 226. The memory 224 of the gateway device 220 may be programmed with one or more programs or routines, including a DNS modification routine 225 for identifying and intercepting any DNS requests relayed from the client device 210 through the network gateway device 220, and modifying or manipulating information in the DNS request to include location information. The location information may indicate the location of the network gateway device 220, the location of the client device 210 or both.

A DNS resolver 230 may be programmed to receive the modified DNS request and look up an IP address of the requested application or service associated with the domain name included in the request. The resolver 230 may also be programmed to transmit an IP request for the application or service containing the identified IP address. The resolver may be operated by a network server system 235 of a network operator, such as a telecommunication service provider or network service provider.

The network server system 235 may include a set of servers. Although a single block is shown in FIG. 2, it should be understood that the actual number of servers used to implement the system 235 and how features are allocated among the servers will vary from one implementation to another, and optionally depends in part on the amount of data traffic that the system must handle during peak usage periods, as well as during average usage periods. The system 235 may include one or more processing units, memory and communication interface components. The memory of the network server systems may include various programs and modules, such as an operating system, network communication module and communication programs for coordinating communication with client devices and other system components, and a deployment management module, also referred to herein as a deployment manager 240 for executing an content deployment routine 242.

In operation, the deployment manager 240 may receive the IP request from the resolver 230 and process the IP request. The memory of the network server systems 235 may be used for storing data, such as a DNS lookup database, and instructions such as a content deployment routine 242. The content deployment routine 242 may include multiple sub-routines, including a service orchestration sub-routine 244 for analyzing a location of the client device based on the DNS request and selecting an edge platform to handle the client device's request based at least in part on the location, an infrastructure preparation subroutine 246 for instructing the selected edge platform to handle the client device's request, and a content retrieval subroutine 248 for directing application or service content from a separate content provider to the selected edge platform.

The service orchestration subroutine 244 may be operated by an orchestration module 252 that sets the policies and methods to enable connections that when implemented on a network deliver the applications and services requested by client devices based on a profile included in the request. The profile may set requirements that the request needs to satisfy, including but not limited to coverage area, availability, bandwidth, reliability, latency, and so on. The orchestration module 252 may further interface with one or more modules defining attributes between the network operator, who provides the network as a service to clients, and providers at different layers in the network, such as network function and infrastructure. The attributes may relate to parameters such as quotas, service locations, pricing, projected usage and subnet information. These attributes or parameters may also include any one or combination of expected profit margin for a network operator, client priority, provider preferences, network operator preferences, licenses and costs consumed at a provider's infrastructure. The modules may use cost estimation algorithms or other optimization functionality to determine one or more edge platforms that are suitable for handling the client request, one or more providers that can fulfill the client request, or a combination thereof.

In some examples, suitability of an edge platform to service a client device may depend at least in part on a distance between the edge platform and the client device, or between the edge platform and a network gateway device to which the client device communicates with the network. In some examples, each edge platform may be assigned a predetermined location, and the orchestration module may select from among the edge platforms for which the client device is in their predetermined locations. Other factors may be applied to ensure that the appropriate edge platforms are selected for use in order to optimize resource allocation at the periphery of the network.

The orchestration module 252 may also interface with a service status database 260. The service status database 260 keeps records of each application or service that is deployed within the network, and on which edge platform or edge platforms the particular application or service is deployed. The service status database 260 may communicate with the orchestration module 252 both to provide current information about which applications and services are already deployed and where, as well as to receive updates about deployment of applications and deletion of instances from the platforms as changes in the network occur. Tracking deployment of applications and services can help the system to avoid re-deploying the same application or service at the same edge location, whether at the same edge platform or at a different edge platform within a certain proximity to the first edge platform already handling the application.

Figure 3:
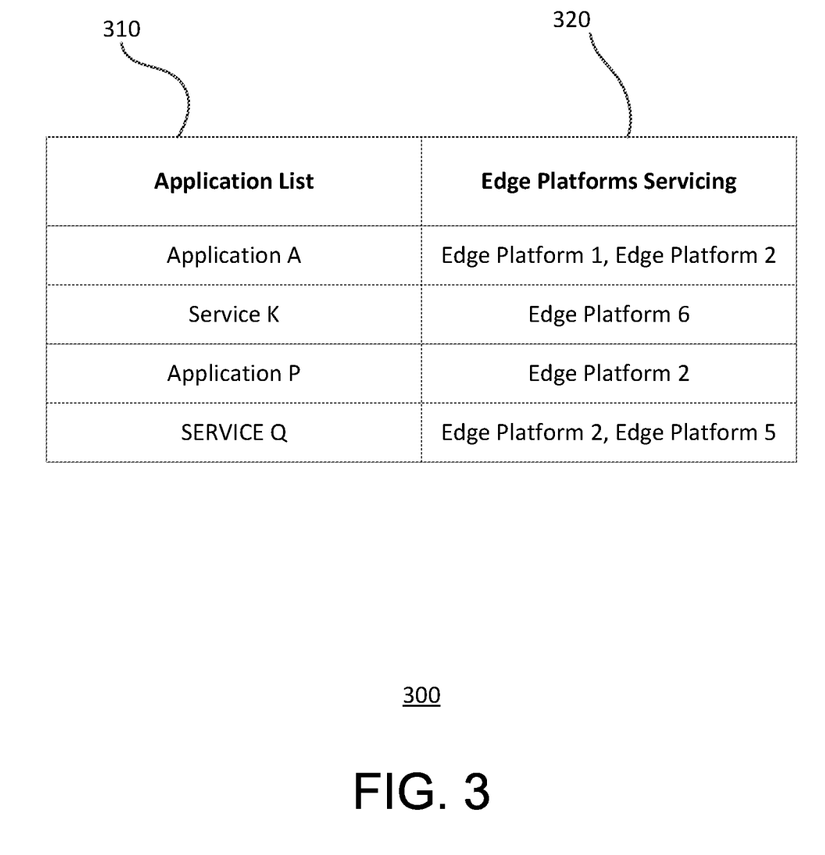
FIG. 3 is an illustration of information in a database in accordance with an aspect of the present disclosure.

FIG. 3 is a chart illustrating an example service status database 300. As shown in FIG. 3, the database may include a list 310 of active applications, services or both and a corresponding list 320 of edge platforms handling deployment of the active applications and services. In the example of FIG. 3, the active applications are defined by an IP address, although other forms of identification may be used in other examples. Additionally, each edge platform may be assigned a unique identification and identified accordingly. In such a database, the query from the orchestration module may be compared to the application list 310, and the database may respond with any identifiers from the second list 320 that correspond to addresses in the first list 310 that match the query.

Returning to FIG. 2, The infrastructure preparation subroutine 246 may also be operated by the orchestration module 252, whereby the determined one or more edge platforms may be instructed by the orchestration module 252 to prepare infrastructure for handling the client request at the network operator layer of the system. The infrastructure preparation subroutine 246 may also involve waiting to receive an indication from the edge platform that the infrastructure is prepared before proceeding with deployment.

The content retrieval subroutine 248 may be operated by a lighthouse service module that establishes an interface for communication between the content or service repository infrastructure of a content or service provider and the computing infrastructure of the network operator. For instance, the lighthouse service 254 may create a token-based application-program interface (API) that guides content and service providers towards the selected edge platform of the network operator's infrastructure. Communications from the content and service providers may proceed directly to the edge platform, which in turn may communicate with the orchestration module 252 to confirm that the content or services from the content or service providers has been deployed. The orchestration module may further communicate with the memory of the one or more servers 235 to update the service status database 250 to indicate the deployment of resources at the selected edge platform in response to the client request.

Example Methods

Figure 4:
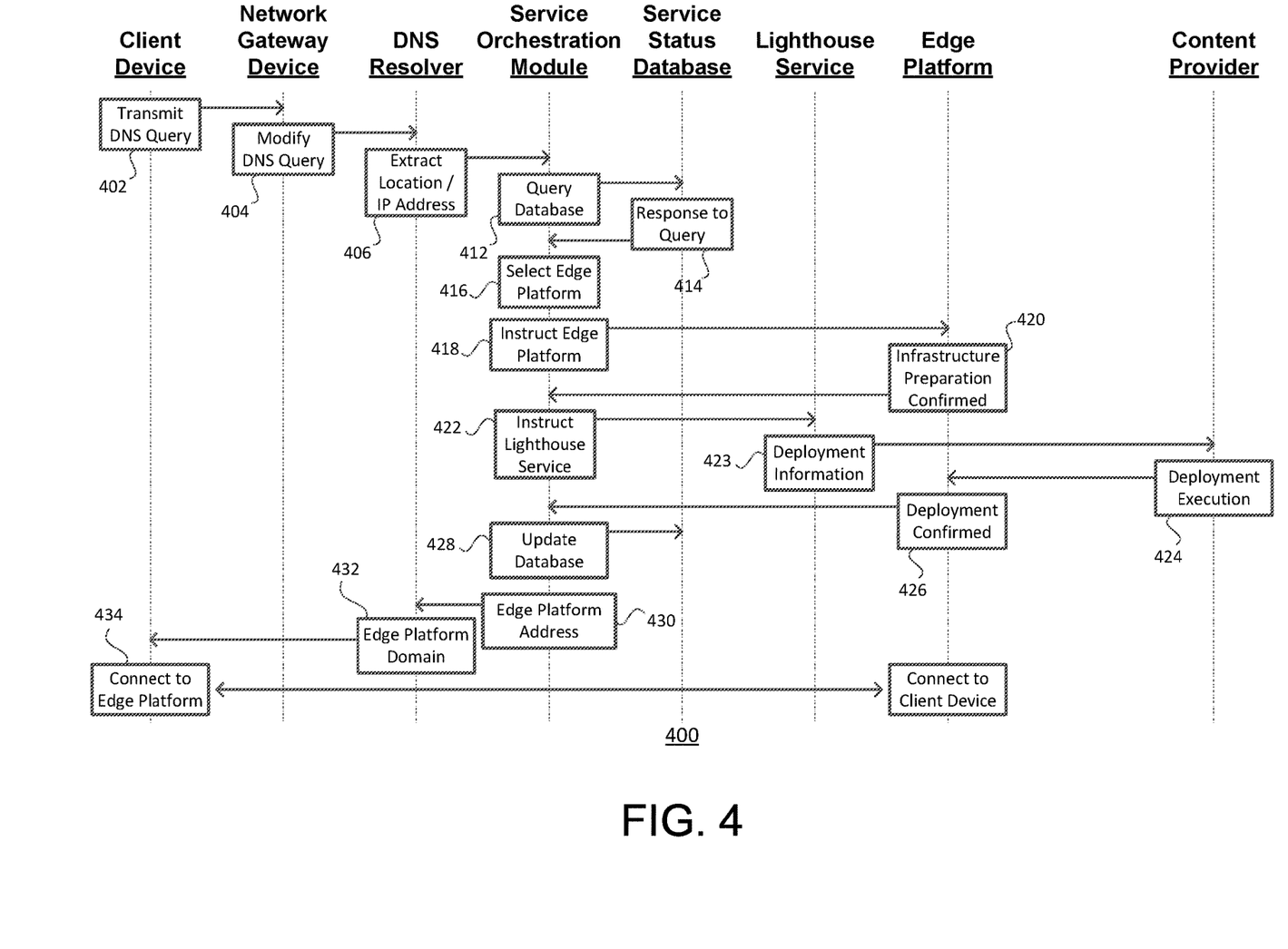
FIGS. 4-7 are flow diagrams illustrating example routines that may be performed in accordance with aspects of the present disclosure.

FIG. 4 is a data flow diagram illustrating an example content deployment routine 400. The routine may be performed using system components of a network operator, such as a network gateway device, a DNS resolver, one or more servers hosting a deployment manager module. The routine demonstrates how these components of the network operator may be utilized to coordinate services between one or more client devices, one or more network edge platforms, and one or more content providers. In many scenarios, the network edge platform may also be a component of the network operator's infrastructure, although in other scenarios, network edge platforms may be operated by different network operators, by content providers, or by other entities connected to the network.

At block 402, a DNS query is transmitted from a client device to a network gateway device. The DNS query may indicate a certain application that is requested by the client device by reference to a domain name. At block 404, the network gateway modifies the DNS query to include location parameters indicative of a general location of the client device. The general location of the client device may be a location of the client device as detected by the network gateway device. For example, if the client device is a vehicle or smartphone and the gateway device is a cell tower, then the location of the client device may be determined by the cell tower using any device location positioning technique known in the art. Additionally or alternatively, the general location of the client device may be the location of the network gateway device, whereby knowledge of the gateway through which the client device connects to the network is sufficient to determine which edge resources are most suitable for servicing the query.

Modifying the DNS query to include location information may involve extending the DNS request with an extension. In some examples, the DNS extension may be a DNS packet header containing the location information. In other examples, the DNS extension may be appended to the location information of the DNS packet. This may be performed using a Gateway GPRS support node (GGSN) of the general packet radio service (GPRS) for transmitting packets to the network.

At block 406, the DNS resolver receives the modified DNS query and extracts the location information from the DNS packet. Also at block 406, the DNS resolver also determines the IP address associated with the domain name included in the DNS query. Determining the IP address may be based on a database accessible to the DNS resolver. The extracted location information and the IP address from the modified DNS query are forwarded to the service orchestration module of the network operator deployment manager.

Once the service orchestration module receives the DNS query and identifies the application indicated in the query, then at block 412, the service orchestration module queries a service status database that stores information about what applications are currently deployed within the network at the one or more edge platforms. The service orchestration module query may be received at the service status database, and at block 414, the service status database may return to the service orchestration module a response to the query. The response may indicate whether the application identified by the DNS query is already deployed at one or more of the edge platforms.

At block 416, the service orchestration module selects an edge platform to handle the application queried by the client device. The determination may be made at least in part based on the information received from the service status database, as well as on information about available resources at the edge platforms, information about each platform's proximity to the client device as indicated by the location information received from the DNS resolver, and in some scenarios information about the provider of the requested application and the costs associated with the various edge platforms communicating with the provider's systems. Information about available resources of the edge platforms may indicate any one or combination of a total amount of available resources, historical data about resource usage, data about current usage, and data about future usage such as based on reservations or forecasting. The resources may include but are not limited to available memory, available CPU processing such as a number of available cores, or available bandwidth. Selection of the edge platform may further involve communication between the service orchestration module and the edge platforms to determine the above-indicated status, resource and location information.

In the example of FIG. 4, it is assumed that the requested application has not already been deployed at an edge platform that is suitable for handling the client request. In such a case, the service orchestration module initiates deployment at the selected edge platform. This may involve the service orchestration module instructing the edge platform to prepare infrastructure for handling the application identified in the client query, shown in block 418. Once the infrastructure has been prepared, then at block 420, the edge platform communicates to the service orchestration module that it is ready for deployment. Next, at block 422, the service orchestration module instructs a lighthouse service of the deployment manager to transmit deployment information for the requested application to the network to be received by the application provider, which is conducted at block 423. The deployment information may identify the requested application and may identify the selected edge platform for managing the request. In response, at block 424, a content repository of the application provider may deliver content over the network to the selected edge platform identified by the lighthouse service. Upon receipt of the content from the provider, at block 426, the edge platform may further communicate with the service orchestration module to confirm that the deployment is complete, thereby indicating to the service orchestration module that the edge platform was successful in deployment and that a different edge platform does not have to be selected. At block 428, either one of the edge platform or the service orchestration module may communicate to the service status database to indicate that the application requested by the client device is now being handled by the selected edge platform.

With the application successfully deployed at the edge platform, the service orchestration module may proceed at block 430 to communicate an IP address of the instance at the edge platform handling the application. The communication may be received by the DNS resolver, which at block 432, may communicate a domain name to the client device. Lastly, at block 434, the client device may connect with the edge platform and traffic may be sent between the client device and the edge platform to handle the requested application.

The technique described in FIG. 4 has some advantages for maintaining user privacy while also utilizing client device location in selecting the best suited resources for handling the client request. This is because communications identifying the client device location are kept entirely within the network operator's components, and are particularly limited to the decisions made by the service orchestration module. Once this decision is made and an edge platform is selected, it is not necessary to expose client device location or any packets containing the client device location information with the content provider in order to establish the service chain. Instead, a separate communication from the lighthouse service is used to direct content from the content provider to the selected edge platform. Furthermore, it is not necessary to share client device location information with even the selected edge platform, as the IP address of the platform may be provided to the client device and the client device may subsequently establish the link for application traffic with the edge platform.

In the example data flow of FIG. 4, because the requested application has not already been deployed at an edge platform that is suitable for handling the client request, it is necessary to initially newly deploy the application at one of the edge platforms in order to handle the client request. However, in order examples, it may be possible that the requested application has already been deployed at an edge platform, and that this edge platform is suitable for handling the request. In such a case, initial deployment of the application may be bypassed altogether.

Figure 5:
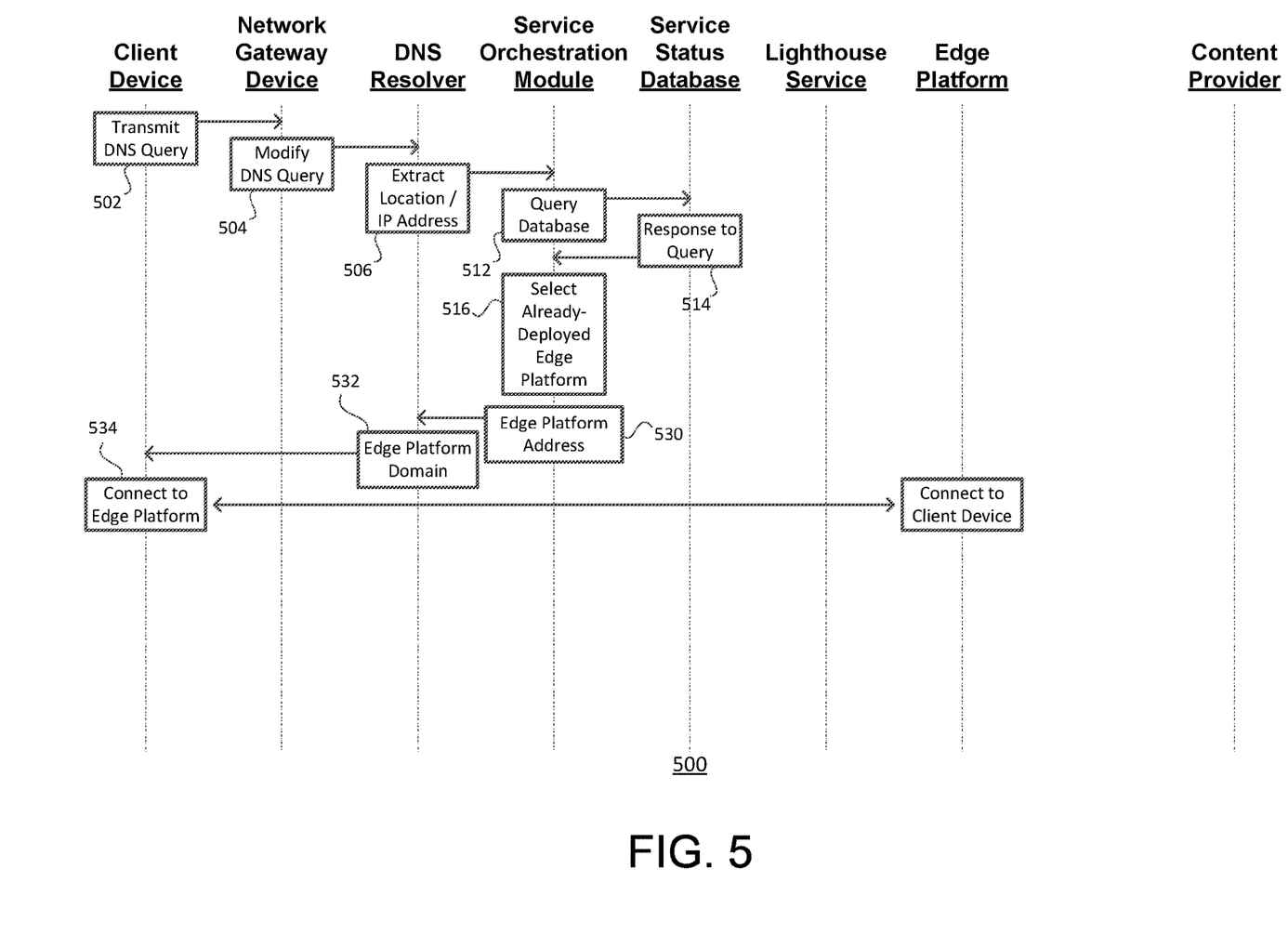

FIG. 5 is another data flow diagram illustrating an example application discovery routine 500 in which the application is already deployed at an edge platform. This may occur when a second client device connects to the network and requests the same application as was requested by the first client device. In the example of FIG. 5, the routine begins with the same step, whereby the actions performed at each of blocks 502, 504, 506, 512 and 514 correspond to blocks 402, 404, 406, 412 and 414 of FIG. 4. In the example of FIG. 5, the information returned by the service status database at block 514 may indicate that the requested application is already deployed at one or more edge platforms. Then, at block 516, the service orchestration module may select the edge platform from the one or more edge platforms where the requested application is already deployed. Since the application is already deployed at the platform, there is no need for the service orchestration module to communicate with the edge platform. Additionally, since the edge platform has already connected with the content provider during the initial deployment, there is also no need for the service orchestration module to instruct the lighthouse service to establish such a connection.

Operations may proceed directly to block 530, in which the service orchestration module communicates an IP address of the instance at the edge platform handling the application to the DNS resolver, which at block 532 may communicate a domain name to the client device. Lastly, at block 534, the client device may connect with the already deployed edge platform and traffic may be sent between the client device and the edge platform to handle the requested application.

The technique described in FIG. 5 maintains all of the privacy advantages of the example routine of FIG. 4, and includes several additional advantages over establishing a new instance at the edge platform or at a different edge platform to handle a second client request. First of all, resources at the edge platforms are limited, so bundling the resources of one edge platform to create a service chain connecting a content provider to two or more clients is preferable. Additionally, resources at the network operator's deployment manager are conserved, since the service status database simplifies the determination for selecting an edge platform and the selection of the already deployed services avoids the need to set up new infrastructure. Furthermore, bandwidth between the network operator and content provider is conserved since the connection between the network operator and content provider may be used for multiple clients.

In the example data flows of FIGS. 4 and 5, it is assumed that one a service chain connection between a client device and an edge platform is established, that the connection will be maintained for the duration of the client's use of the application. However, in many situations, a client device is in motion, and the edge platforms that are best suited for handling the client request may change over time. Additionally, the network gateway device through which the client device connects to the network can also change over time. In such cases, it may be necessary to determine whether to maintain an existing connection to continue serving the client device, or whether to establish a new connection using a different edge platform. Additionally, if the application is deployed at a new edge platform, it may also be necessary to execute a handover between the edge platforms.

Figure 6:
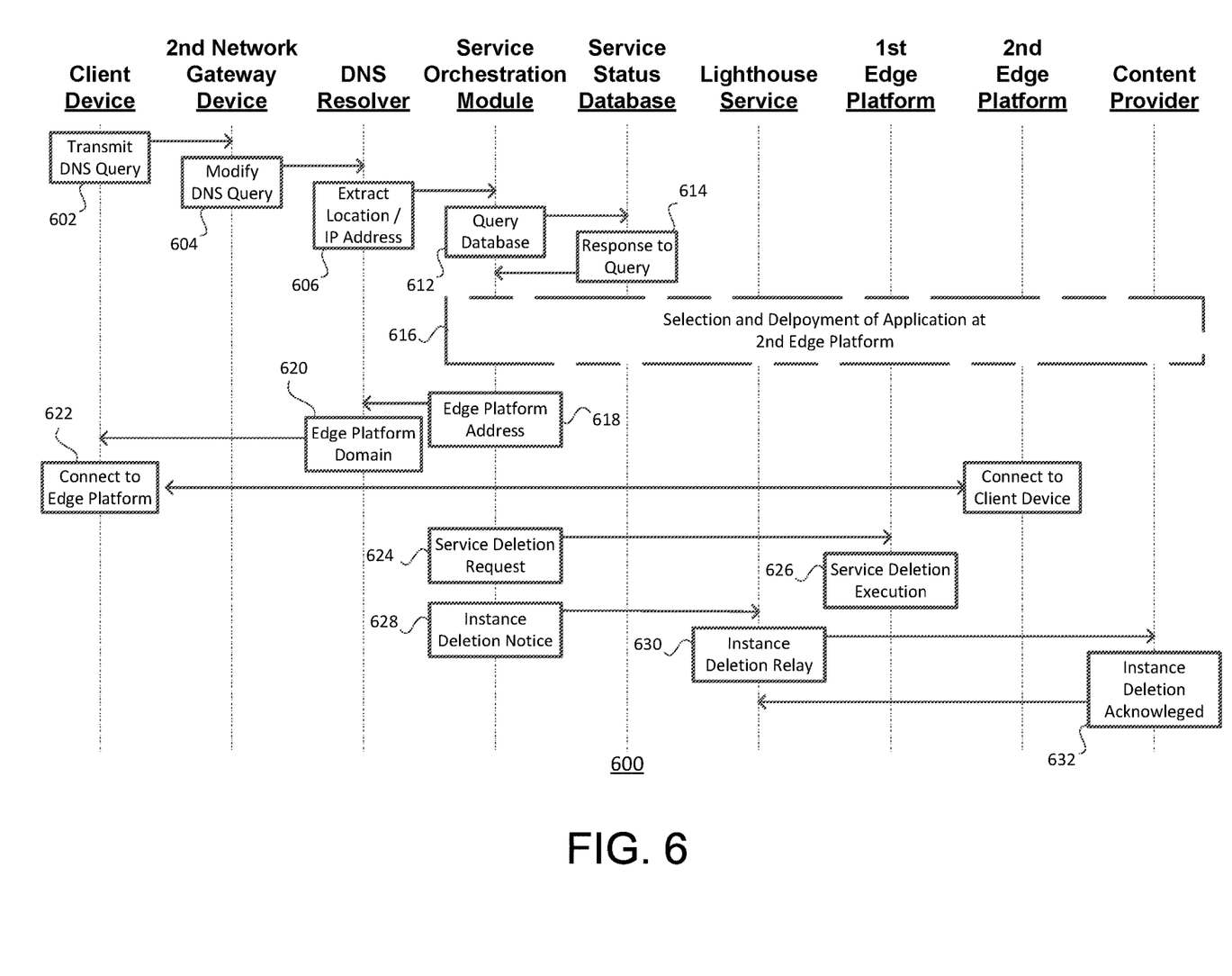

FIG. 6 is another flow diagram illustrating an example platform change routine 600 for handling device handover between two edge platforms in response to a change in location of the client device.

Operations of the routine 600 may begin after deployment of the requested application at a first edge platform in accordance with the routine 400 of FIG. 4. Afterwards, the client device may change locations, which in turn may cause the device to connect to a different network gateway device. At block 602, a DNS query from the client device may be received at the new network gateway device. The DNS query may indicate the same application that was requested by the client device and for which a service chain was initiated at the first edge platform. At block 604, the network gateway modifies the DNS query to include location parameters indicative of the new location of the client device, referred to herein at the destination location. At block 606, the DNS resolver receives the modified DNS query and extracts the location information of the destination location, and determines the IP address associated with the domain name included in the DNS query. The extracted location information and the IP address from the modified DNS query are forwarded to the service orchestration module. At block 612, the service orchestration module queries the service status database to determine whether the application is deployed at any edge platforms that are suitable for servicing the client device at the destination location, and at block 614 a response to the query is received.

For purposes of the present example of FIG. 6, it is assumed that the first edge platform is no longer suitable for handling the client request, possibly due to a large distance between the destination location and the first edge platform as compared to other edge platforms. In such a case, at block 616, the service orchestration module initiates deployment at a second selected edge platform. Content deployment at the second edge platform may follow the same or similar steps as are shown in blocks 418 through 428 of FIG. 4, in which the second edge platform prepares infrastructure for servicing the client device request, and the lighthouse service directs communications from the content provider to the second edge platform. Once deployment is complete and the service status database is updated to reflect the presence of the content deployment in both the first and the second edge platforms, operations may continue at block 618, the service orchestration module communicating the IP address of the instance at the second edge platform handling the application to the DNS resolver, which at block 620 may communicate a domain name to the client device so that the client device, at block 622, can connect with the second edge platform and application traffic may be sent between the client device and the second edge platform to handle the requested application.

In response to confirmation of successful deployment of the application at the second edge platform, the service orchestration module may also initiate an instance deletion protocol for deleting the instance at the first edge platform. The instance deletion protocol may involve, at block 624, the service orchestration module transmitting a service deletion request to the first edge platform, and waiting to receive acknowledgment of the request by the first edge platform, which occurs at block 626. Then, at block 628, the service orchestration module transmits an instance deletion notification to the lighthouse service, and at block 630 the lighthouse service relays the deletion notification to the content provider. At block 632, acknowledgment of the instance deletion at the first edge platform is acknowledged by the content provider to the lighthouse service.

Figure 7:
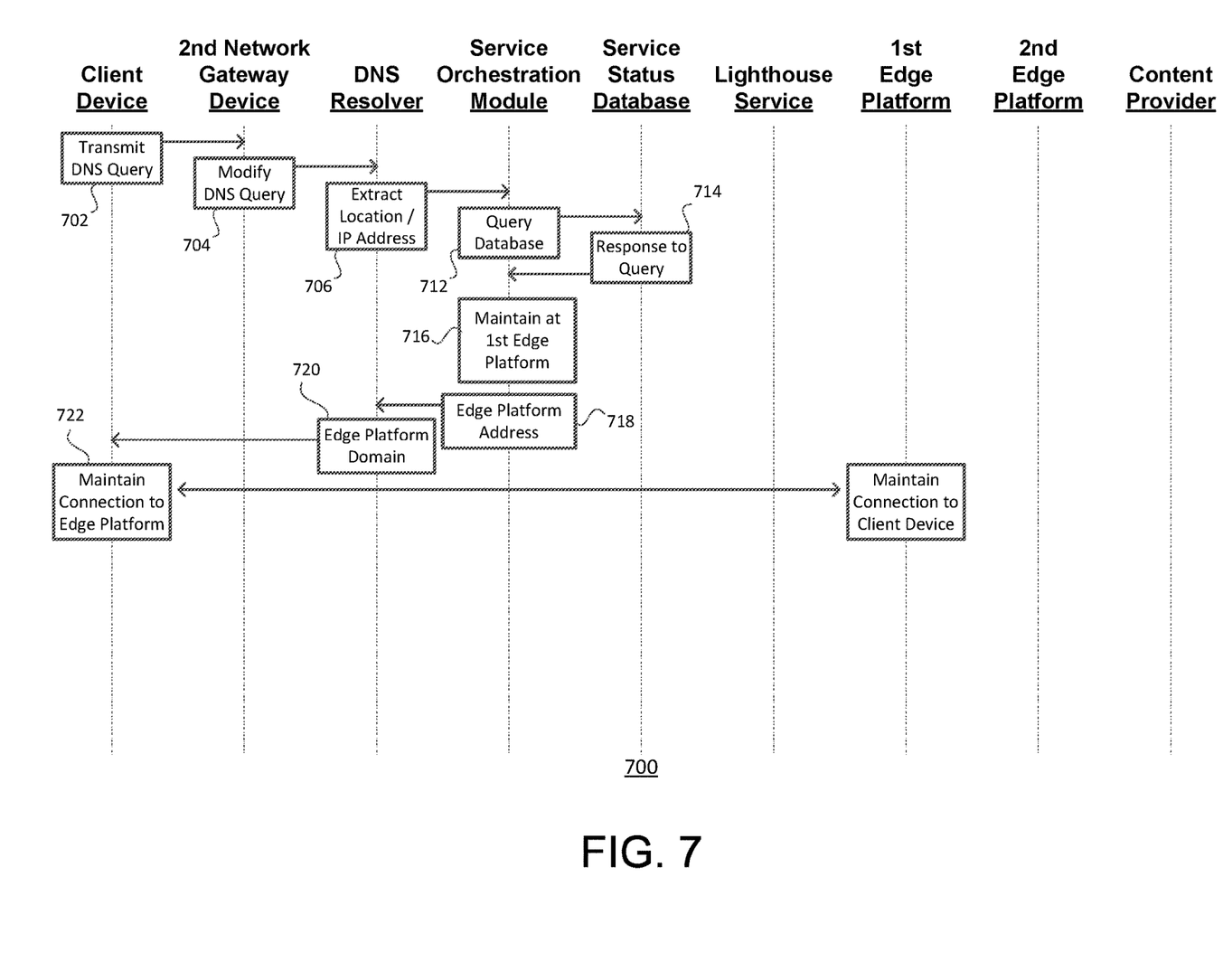

In other examples, a change in the network gateway devices that connects the client device to the network may not warrant a change in edge platforms. For instance, the first edge platform may still be relatively close to the destination location, the destination network gateway device, or both, and may still be the best-suited edge platform for servicing the client request. FIG. 7 illustrates an example data flow to handle such a case.

FIG. 7 is another data flow diagram illustrating an example network gateway handover routine 700 in which the application is already deployed at an edge platform. Like with the routine 600 of FIG. 6, the routine 700 of FIG. 7 routine may begin after deployment of the requested application at a first edge platform in accordance with the routine 400 of FIG. 4. Additionally, the actions performed at each of blocks 702, 704, 706, 712 and 714 correspond to blocks 602, 604, 606, 612 and 614 of FIG. 6. In the example of FIG. 7, the information returned by the service status database at block 714 may indicate that the first edge platform is suitable for continuing to service the client device request. Then, at block 716, the service orchestration module may determine to maintain operations at the first edge platform instead of deploying the application at a different edge platform. Since the application is already deployed at the first edge platform, there is no need for the service orchestration module to communicate with the first edge platform or any other edge platform. Additionally, since the first edge platform has already connected with the content provider during the initial deployment, there is also no need for the service orchestration module to instruct the lighthouse service to establish the connection again.

Operations may continue at block 718, the service orchestration module communicating the IP address of the instance at the first edge platform handling the application to the DNS resolver, which at block 720 may communicate a domain name to the destination network gateway device so that the client device, at block 722, application traffic between the client device and the first edge platform and application traffic continues to be sent.

The example routines of FIGS. 6 and 7 demonstrate how application edge discovery can be performed multiple times during even a single session at the client device without interrupting the session and without a user of the client device experiencing any lag or pause in service. Additionally, the techniques demonstrate how gateway handover can be managed from a mobile network control plane using a repeated modified DNS query protocol so that DNS modification and interrogation continue to occur and is capable of triggering the edge discovery process when needed.

In the examples of FIGS. 6 and 7, the edge discovery process at the service orchestration module is described as occurring for each DNS query received. However, it should be understood that fewer processes may be executed, such as by first determining whether the first edge platform is sufficient for service, and only when the platform is considered insufficient conducting the discovery processes to select a new edge platform. In such a case, even if a second edge platform is better suited for handling the application due to changes in the client device's location, the platform change may be delayed until there is a larger amount of degradation in the connection with the first edge platform.

The above example routines generally describe deployment of server resources for running an application based on a client request. However, the same or similar principles may be applied to the server architecture to support other types of client requests, such as requests to access content, requests to execute services, and the like. For example, the edge platform may be leveraged by a client node to collect streaming content in order to reduce latency between the original provider of the content and the client node. For further example, the client request may involve executing one or more web-based services for which proximity to the client node can reduce latency.

Also, the above example systems and routines generally describe using a network gateway device to append location information to a DNS query. However, it should be appreciated that in some cases, a client device may be capable or configured to include the location information itself before transmitting the modified DNS query, avoiding the need for the gateway device to intercept and further modify the query.

Additionally, the above example systems generally describe a telecommunications service provider, or telco for short, as operating the edge platform network and a content provider as hosting the data requested by the client query. However, in other scenarios, networks may include many more entities than a single telco and a single content provider. For instance, in some cases, the telco may communicate with multiple content providers, or with other telcos in order to connect with sources of requested content, applications or services. In other cases, the edge platform itself may be hosted by an entity other than a telecommunications service provider, such as by a content provider for which the user of the client device is a subscriber. The edge platform of the content provider may then receive the location information of its subscribers and communicate with content repositories of other content providers, either directly over the network or through other communications service providers, in order to provide more local service for the subscriber. In any of these scenarios as well as other scenarios, the use of the edge platform along with a deployment manager may help to improve user experiences in accessing applications, services or other content.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for managing content deployment in a network, the method comprising:
receiving, at a network gateway device, a domain name service (DNS) request from a client device, the DNS request for content from a third-party provider;
modifying, at the network gateway device, the DNS request to include location information indicative of a location of the client device;
receiving, by a DNS resolver, the modified DNS request from the network gateway device;
determining, by the DNS resolver, an address of the requested content based on a domain name included in the DNS request;
receiving, by a deployment manager, the address of the requested content and the location information from the DNS resolver;
accessing, by the deployment manager, a service status database indicating at which one or more edge platforms of the network the content is deployed;
selecting, by the deployment manager, a first edge platform based on the location information and the service status database; and
notifying, by the deployment manager, the client device of the first edge platform handling the requested content, wherein the method further comprises:
  in response to the service status database indicating that the content is not yet deployed at any of the edge platforms of the network:
    instructing, by the deployment manager, the first edge platform to prepare infrastructure for handling the content;
    instructing, by the deployment manager, the third-party provider to deploy the content to the first edge platform; and
    updating the service status database to indicate that the content is deployed at the first edge platform.

2. The method of claim 1, wherein the content is an application, and wherein the prepared infrastructure includes a service instance for running the deployed content.

3. The method of claim 1, wherein selecting the first edge platform is based at least partially on a distance between the first edge platform and the client device location being shorter than a distance between another edge platform and the client device location.

4. The method of claim 1, wherein instructing the third-party provider to deploy the content to the first edge platform is performed using a token-based application program interface (API) and without providing the client device location to the third-party provider.

5. The method of claim 1, further comprising:
  receiving, at the network gateway device, a second DNS request from a second client device, the second DNS request for the content;
  modifying, at the network gateway device, the second DNS request to include second location information indicative of a location of the second client device;
  receiving, by the DNS resolver, the modified second DNS request from the network gateway device;
  determining, by the DNS resolver, the address of the requested content based on the domain name included in the second DNS request;
  receiving, by the deployment manager, the address of the requested content and the second location information from the DNS resolver;
  accessing, by the deployment manager, the service status database indicating at which one or more edge platforms of the network the content is deployed;
  selecting, by the deployment manager, the first edge platform at least partially in response to the service status database indicating that the content has already been deployed at the first edge platform of the network and the second location information; and
  notifying, by the deployment manager, the second client device of the first edge platform handling the requested content.

6. The method of claim 1, further comprising:
  receiving, by the deployment manager, a second request from the client device, the second request containing the address of the content from the third-party provider, the second request further containing second location information indicating a second location of the client device different from the first location;
  determining, by the deployment manager, whether to service the second request using the first edge platform or using a second edge platform based on the second location information; and
  notifying, by the deployment manager, the client device of the determined first or second edge platform for servicing the second request.

7. The method of claim 6, further comprising, in response to determining to service the second request using the first edge platform, transmitting, by the deployment manager, an IP address of the first edge platform to the client device without the deployment manager communicating with the first edge device and without the deployment manager communicating with the third-party provider.

8. The method of claim 6, further comprising, in response to determining to service the second request using the second edge platform:
  instructing, by the deployment manager, the second edge platform to prepare infrastructure for handling the content;
  instructing, by the deployment manager, the third-party provider to deploy the content to the second edge platform; and
  transmitting, by the deployment manager, an IP address of the second edge platform to the client device.

9. The method of claim 8, further comprising:
  receiving, by the deployment manager, confirmation of deployment of the content at the second edge platform; and
  in response to receiving the confirmation, instructing, by the deployment manager, the first edge platform to terminate deployment of the content at the first edge platform.

10. The method of claim 6, wherein the first request is received by the deployment manager via a first network gateway device configured to add the first location information to the first request, and wherein the second request is received by the deployment manager via a second network gateway device configured to add the second location information to the second request.

11. The method of claim 6, further comprising, in response to determining to service the second request using the second edge platform:
  instructing, by the deployment manager, the second edge platform to prepare infrastructure for handling the content;
  instructing, by the deployment manager, the third-party provider to deploy the content to the second edge platform; and
  transmitting, by the deployment manager, an IP address of the second edge platform to the client device;
  receiving, by the deployment manager, confirmation of deployment of the content at the second edge platform;
  in response to receiving the confirmation, instructing, by the deployment manager, the first edge platform to terminate deployment of the content at the first edge platform; and
  updating the service status database to indicate that the content is deployed at the second edge platform and not deployed at the first edge platform.

12. A system for managing content deployment in a network, the system comprising:
  memory storing a database indicating a plurality of applications and services and at which ones of a plurality of edge platforms of the network the plurality of applications and services are deployed; and
  one or more processors configured to:
    receive, from a first client device, a first request for servicing an application or service on an edge platform of the network, the first request including first location information indicative of a location of the first client device;
    access the database in response to receiving the first request;
    select a first edge platform based on the first location information and the database; and notify the first client device of the first edge platform servicing the requested application or service;

wherein the one or more processors are further configured to:

in response to the service status database indicating that the content is not yet deployed at any of the edge platforms of the network:

instruct the first edge platform to prepare infrastructure for handling the content;

instructing the third-party provider to deploy the content to the first edge platform; and update the service status database to indicate that the content is deployed at the first edge platform.

13. The system of claim 12, further comprising the plurality of edge platforms, each edge platform comprising one or more servers positioned geographically within a predetermined location or region of the network.

14. The system of claim 13, further comprising a plurality of network gateway devices in communication with the one or more processors and configured to relay the first request from the first client device to a domain name service (DNS) resolver, the DNS resolver configured to extract an IP address from the relayed request and transmit the IP address to the one or more processors, wherein the first request received by one or more processors contains the extracted IP address.

15. The system of claim 14, wherein the plurality of network gateway devices are further configured to modify the first request to include the first location information, and wherein the DNS resolver is configured to transmit the IP address and the first location information of the first request to the one or more processors.

16. The system of claim 13, wherein the plurality of edge platforms are operated by a telecommunications service provider, wherein the requested application or service is hosted by a content provider separate from the telecommunications provider, and wherein communications between the plurality of edge platforms and infrastructure of the content provider does not include the first location information.

17. The system of claim 12, wherein the one or more processors are further configured to:

receive, from a second client device, a second request for servicing the application or service on an edge platform of the network, the second request including second location information indicative of a location of the second client device;

access the database in response to receiving the second request, the database indicating that the requested application or service is already being serviced at the first edge platform;

in response to the second location information meeting one or more proximity criteria for the first edge platform, select the first edge platform and notify the second client device of the first edge platform servicing the requested application or service; and in response to the second location information not meeting the one or more proximity criteria for the first edge platform, select a second edge platform and notify the second client device of the second edge platform servicing the requested application or service.

18. The system of claim 12, wherein the one or more processors are further configured to:

receive, from the first client device, a second request for servicing the application or service on an edge platform of the network, the second request including second location information indicative of an updated location of the first client device;

in response to the second location information meeting one or more proximity criteria for the first edge platform, notify the second client device of the first edge platform continuing to service the requested application or service; and in response to the second location information not meeting the one or more proximity criteria for the first edge platform:

select a second edge platform, wherein the second location information meets the one or more proximity criteria for the second edge platform;

notify the second client device of a change to the second edge platform servicing the requested application or service; and instruct the first edge platform to terminate servicing the requested application or service.

19. A method for managing content deployment in a network, the method comprising:

receiving, at network gateway device, a domain name service (DNS) request from a client device, the DNS request for content from a third-party provider;

modifying, at the network gateway device, the DNS request to include location information indicative of a location of the client device;

receiving, by a DNS resolver, the modified DNS request from the network gateway device;

determining, by the DNS resolver, an address of the requested content based on a domain name included in the DNS request;

receiving, by a deployment manager, the address of the requested content and the location information from the DNS resolver;

accessing, by the deployment manager, a service status database indicating at which one or more edge platforms of the network the content is deployed, wherein the service status database is updatable by the deployment manager to indicate a current state of deployment of the content at the one or more edge platforms of the network;

determining, by the deployment manager, that the content has already been deployed by a third party provider to a first edge platform and that infrastructure has already prepared by the first edge platform to handle the content a first edge platform based on the current state of deployment of the content contained in the service status database;

selecting, by the deployment manager, the first edge platform based on the location information and the determination that the content has already been deployed to the first edge platform; and notifying, by the deployment manager, the client device of the first edge platform handling the requested content.

* * * * *